United States Patent
Hamann et al.

(10) Patent No.: US 6,757,745 B1
(45) Date of Patent: Jun. 29, 2004

(54) DISTRIBUTED OPERATING SYSTEM FOR CONTROLLING NETWORK ELEMENT IN A DATA OR TELECOMUNICATION NETWORK

(75) Inventors: Jan Hamann, München (DE); Thomas Werner, München (DE); Umesh Bhavsar, Boca Raton, FL (US); Ralf Rieken, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/581,448

(22) PCT Filed: Oct. 12, 1999

(86) PCT No.: PCT/DE99/03277

§ 371 (c)(1),
(2), (4) Date: Jun. 13, 2000

(87) PCT Pub. No.: WO00/24205

PCT Pub. Date: Apr. 27, 2000

(30) Foreign Application Priority Data

Oct. 19, 1998 (DE) .......................................... 198 48 115

(51) Int. Cl.[7] .............................. G06F 15/16; H04J 3/16
(52) U.S. Cl. ........................ 709/250; 709/223; 370/469
(58) Field of Search ................................ 709/201, 223, 709/250; 370/464, 469

(56) References Cited

U.S. PATENT DOCUMENTS

| | | | | |
|---|---|---|---|---|
| 4,430,699 A | * | 2/1984 | Segarra et al. | 709/230 |
| 5,457,797 A | | 10/1995 | Butterworth et al. | |
| 5,588,121 A | * | 12/1996 | Reddin et al. | 712/29 |
| 5,651,006 A | * | 7/1997 | Fujino et al. | 370/408 |
| 5,960,004 A | * | 9/1999 | Ramstrom et al. | 370/469 |
| 6,035,331 A | * | 3/2000 | Soga et al. | 709/223 |
| 6,088,356 A | * | 7/2000 | Hendel et al. | 370/392 |
| 6,115,378 A | * | 9/2000 | Hendel et al. | 370/392 |
| 6,192,034 B1 | * | 2/2001 | Hsieh et al. | 370/241 |
| 6,363,421 B2 | * | 3/2002 | Barker et al. | 709/223 |
| 6,487,590 B1 | * | 11/2002 | Foley et al. | 709/223 |

OTHER PUBLICATIONS

Steve Vinoski, "COBRA: Integrating Diverse Applications Within Distributed Heterogeneous Environments", IEEE Communications Magazine, Feb. 1997, vol. 35, No. 2, pp. 46–55.

A. Gokhale et al; "The Performance of the COBRA Dynamic Invocation Interface and Dynamic Skeleton Interface Over High–Speed ATM Networks", Global Telecommunications Conference, (1996), pp. 50–56.

* cited by examiner

Primary Examiner—Krisna Lim
(74) Attorney, Agent, or Firm—Morrison & Foerster LLP

(57) ABSTRACT

A distributed operating system for controlling network elements in a data or telecommunication network in which the operating system controls a data and communication network consisting of various underlying physical base networks. These base networks consist of network elements that provide various network (basic) services and network functions and can be controlled by system-specific calls. Accordingly, there exist higher-ranking network elements that are equipped with specific operating system components and execute basic functions independent of the physical subnetworks, such as accessing the physical base networks, distributing the calls of basic services, and converting the calls into the corresponding system-specific formats.

17 Claims, 7 Drawing Sheets

DISTRIBUTED OPERATING SYSTEM FOR CONTROLLING NETWORK ELEMENT IN A DATA OR TELECOMUNICATION NETWORK

BACKGROUND OF THE INVENTION

The present invention relates to a distributed operating system for controlling network elements in a data or telecommunication network.

For the network operator of telecommunication networks, it is becoming more and more important to be able to provide the network users with what are known as network services or integrated value-added services, in addition to simple basic services such as transmission of voice or data. What is meant by this is that the combination and enhancement of the basic services, for instance the unique number in different networks (Universal Personal Number, stationary and permanent networks), forwarding and answering machine functions in the network, and many others.

A known technical solution is an intelligent network, which is controlled centrally by a network element, that is known as the SCP (Service Control Point). This is described in the protocol suite Q. 12xx of the ITU.

A significant disadvantage of intelligent network technology is the strong dependency on the central network element in particular. The highly cost-intensive usage of high-performance and fail-safe hardware, on the one hand, and what are known as backup systems, on the other hand—i.e. a doubling of the most important elements of the system (hardware and software),—is required in order to guarantee the necessary fail-safety in running operations.

SUMMARY OF THE INVENTION

It is the object of an invention to propose a solution as to how the network elements in an adaptive network architecture can be controlled and how value-added services can be provided network-wide and separately according to the provider. The above described disadvantages of the technology of intelligent networks should be avoided.

This and other objects are achieved by a distributed operating system controlled by a method connecting one or more higher ranking network elements in the network that provide network functions and services and providing that distributed network having system-independent interfaces, the distributed network integrating the network functions and services and basic services from lower ranking physical data networks via the one or more higher ranking network elements and making the network functions and services and basic services available to an upper most layer via the system independent interfaces.

The term physical base network refers to a homogenous network such as the telephone network (POTS) for the analog transmission of data such as speech, an ISDN network for digital transmission, the mobile telephone network, or the Internet, which is itself composed of individual networks.

A network operator is responsible for such a base network.

In the following comments, various terms are used for functions and services are described a basic service is a basic service as provided to the user by the physical base network, potentially voice transmission in POTS, or the bearer services in ISDN;

a network function, on the other hand, is needed for operating a network and its services, though it is not directly visible to the user of network services. Traffic monitoring or routing belong to such functions, for example.

A network service is composed of basic services and possible enhancements (e.g. ISDN services).

An integrated value-added service is a network service that can be composed of network services even of different physical base network services. This can be provided by the network operator or by what is known as a service integrator as well.

An application refers to what is known as the application layer. Here the previously neutral network services and value-added services are adapted to the respective demand of the service provider and of the service user; such as, with respect to charging and tariff rating of services, for example The communication with the physical base network is accomplished via the call of network functions, network services and basic services in the respective system-specific format. This refers to INAP (Intelligent Network Application Part), SS7(Signalling System No 7) or MAP (Mobile Application Part), for example.

A basic function is an additional function that is introduced by means of a new enhanced network architecture. It enables access to a physical base network or the distribution of the calls of the network services and functions that are distributed in the network, for example.

Neighboring network elements refers to such elements that are located in one logic level of the utilized network architecture. By contrast, a lower-ranking network element is at least one hierarchical level below the higher-ranking element.

The operating system of the present invention controls a data and communication network consisting of various lower-ranking physical base networks. These base networks consist of network elements which provide different network (basic) services and network functions and can be controlled with system-specific calls.

Accordingly, there exist corresponding higher-ranking network elements that are equipped with specific operating system components and which execute basic functions that are independent of the physical subnetworks, such as accessing the physical base network, distributing calls of basic services, and converting the calls into the corresponding system-specific formats (providing the interfaces). These higher-ranking network elements can be part of the existing physical networks or stand-alone network elements.

The interfaces that enable the accessing of the physical base services can be laid open on the system-independent side, such as in the form of a standardization of a unified access format, for example.

This structure of the data and communication networks distributes the control of the basic services, network services and value-added services to the network elements in that information needed for interworking is exchanged. The network elements can either be identical in structure or different.

In this way, the problems of centralized control such as those that exist in an intelligent network (reliability, availability, "bottleneck", error tolerance) are avoided.

Furthermore, an integration of different basic services of different physical base networks is possible.

The insertion and removal of individual network elements or whole physical base networks should be possible without any problems. Therefore, the information that is stored in the network elements (in particular in the higher-ranking network elements) is regularly updated and distributed to the neighboring network elements in order to make it possible to coordinate the function and service calls. This relates not only to the insertion of new services and base networks (independent of manufacturer), but also to the modification of already existing services and base networks. This mode of functioning creates a flexibility that is a precondition for introducing ever new value-added services (particularly those consisting of combinations of basic services of different physical base networks).

For the distributed execution of functions, the distributed operating system can control the network elements according to the client-server principle. Each network element should be able to work either as client or server, which is guaranteed by a uniform structure of each network element.

This makes it possible to transport function and service calls through the network and to have the calls processed at the most suitable network element. It is also possible that network services and functions may be executed by several network elements.

An application call can be executed in a distributed manner. It may be necessary for this purpose to divide it into subfunctions or subservices in advance.

The operating system controls the execution of these functions and services in that the relevant network elements receive the function and service calls via the defined system-independent open interfaces and convert them into system-specific calls. This makes individual functions available in such a way that integrated value-added services can be formed from basic services and functions of different physical base networks.

The operating system controls the execution of the service and function calls on the basis of information present in the network elements about which network element possesses which functionalities. The calls are routed to the corresponding appropriate network elements.

Various principles of path selection methods can be individually or jointly applied to this end. Examples include dynamic routing (i.e. the information that is distributed to the network elements about the capabilities of the network elements is continuously updated in that messages are generated by network elements that are affected by modifications, which messages are distributed in the network and evaluated by the other network elements)

distributed routing (i.e. any element located in the network can make path selection decisions (no central control of the path selection)

multi-path routing (i.e. a distribution of the function and service calls via several paths, so that, in part, it is also possible to initiate a multiple execution of the call in different network elements. This increases the throughput (the fastest path), the redundancy, and, hence, the error tolerance)

hierarchical routing (i.e. an application call is first split into subfunction and subservice calls and is forwarded (potentially even via several abstraction levels), and only then into basic functions and services which can be executed)

link state routing (i.e. only that information which describes the modifications to network element capabilities is sent for the purpose of path selection (network mapping). This reduces the data flow which is necessary for administrative purposes)

function class routing (i.e. calls are prioritized with regard to their processing, for instance according to permitted time delay, required throughput and required availability, for example In accordance with an embodiment of the present invention, the operating system can be constructed in 3 layers:

an application layer a service development layer, a network element functionality layer.

The different layers realize different tasks and are active in the network elements in different ways depending on whether a client or server role is assumed, although they occur the same way in all network elements.

The application layer provides the applications. This layer is active only in the case where the network element is acting as a client.

The middle layer (server development layer) has the following tasks:

converting application calls via corresponding interfaces into function and service calls, potentially with the aid of APIs (Application Programming Interfaces);

forwarding the function and service calls to appropriate network elements for further processing according to the information stored in the network elements relating to the network, in a suitable manner, namely with the required parameters in the system-specific format of the physical base network;

resource and performance management;

billing and rating (processing specific data via connections, such as AMA data);

security;

error management (detecting, processing, evaluating errors);

managing the required information (e.g. in data bases); and transaction monitoring.

The operating system can control every network element either as client or as server, depending on whether the network element is a requesting element or an executing element. The service development layer can also be operated as client or server depending on the function being assumed.

When the network element is operating in the request mode (as a client), the following functionalities are active:

operation of an interface (interface manager), which accepts system-independent service and function calls and translates them into corresponding system-dependent calls (base-network-dependent) in order to then forward them to the appropriate system-specific transport mechanisms, with, the information that is needed for the path selection of the function and service calls maintained, with providing commonly needed basic services (e.g. address conversion, data replication, database management); and transport mechanisms for readying the connection to the network elements and to the system-specific call format needed therefor.

There are various types of transport mechanisms, including server-specific transport mechanisms, dependent on the network elements of the underlying base network; and server-independent (default) transport mechanisms for communication between neighboring network elements, such as within the application layer, for example If the interface manager, with the aid of the information available to it, identifies that the network element in which it resides is directly connected to the base network that is responsible for executing the call, then this function call is converted into the system-specific format of the corresponding base network and is transferred to the connected network element of the base network for execution. The dynamic updating of the information about capabilities of a network is ensured in that when new basic functions and services are available, each element (server) in the network updates information for the updating of the server-specific transport mechanisms and distributes it to other network elements (clients), on the basis of which the interfaces and further information (such as routing tables) in these network elements are modified.

If the network element in which the interface manager resides is not directly connected to the element that is responsible for executing the call, this call is transferred to a standard transport mechanism. This then ensures that the function call is appropriately routed to network elements that receive and execute these calls as server or that, as clients, ensure their processing.

When the network element is currently operating in execute mode (as a server), the following functionalities are active in the service development layer:

with a firewall;

an access check;

a filter for monitoring and controlling received calls and messages.

The network functionality contains the following tasks for executing the function and service calls:

connection control;

call control;

user programs;

feature control;

switching;

path selection;

transport.

The network operating system can structure the overall telecommunication network into several layers (i.e. the functional network domains) These network domains define the type and manner of the application calls in subfunction and subservice calls and so on. This principle makes possible the above mentioned hierarchical routing.

Since the information about the capabilities of the network elements is exchanged in hierarchical layers, each network element only requires knowledge about the functional capabilities of a limited number of network elements. Depending on the requirements with respect to processing duration and speed of calls, it is possible for different network elements (i.e. possible servers) to be selected in the network element (i.e. functioning as client), and the server-specific transport mechanisms connected to these can be addressed in order to optimize processing times and network throughput times. The functional domains can be oriented to the existing base networks, for example, or to various organizational structures or network operators.

In turn, the network domains can consist of core network elements and standard network elements. All network elements must contain information (for the path selection) about which function and service classes can be executed in particular domains.

The core network elements are essentially responsible for executing the application requests and service and function calls. Here, circumstances should be avoided under which calls can no longer be executed with the requisite quality of service (bandwidth, time, and so on). For this reason, application requests and service and function calls can be prioritized and allocated to the various executing network elements corresponding to the existing resources. For the optimal functioning of these network elements, a dynamic updating of the path selection tables is necessary, and, thus, a continuous updating of the type, scope and location of the network functions, services and resources that are available in the network.

Standard network elements, on the other hand, specifically perceive functions of detection and classification as well as the path selection in those service and function calls that could not be executed by a core network element. The following mechanisms are needed for handling calls, for example:

forwarding the call to a network domain having a corresponding service and function class; an forwarding the call to a network element having a corresponding service and function class;

forwarding the call to a network element or a network domain of which it is known that similar services and functions or service and function classes are executed there; and rejecting calls.

Standard network elements also perceive functions of access control for network domains, for instance in cases in which particular limits exist with respect to the execution of applications, functions and services. The calls are permitted, rejected or provided with a priority.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference designations represent like elements throughout and wherein.

DETAILED DESCRIPTION OF THE PREFERRED EMBODIMENTS

Figure 1:
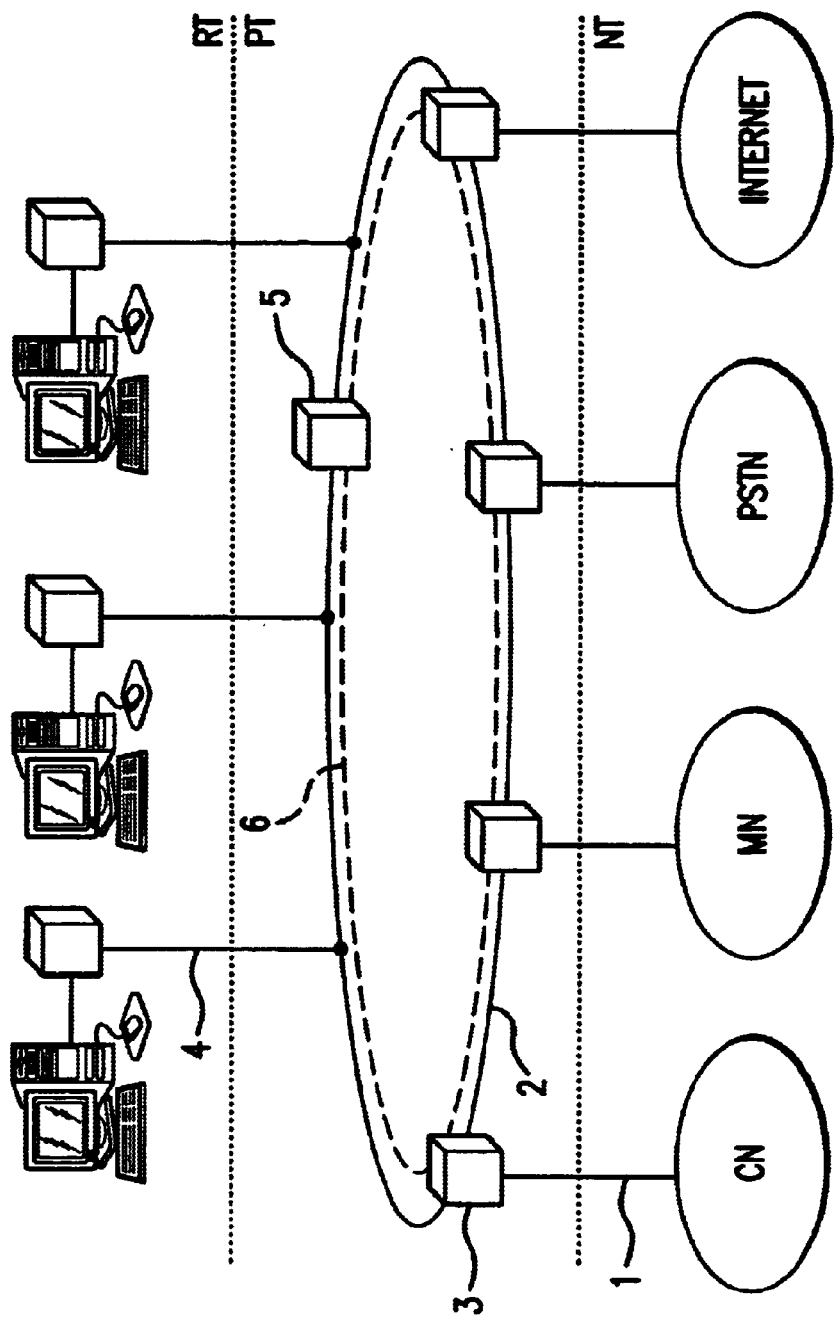
FIG. 1 shows a an example of a distributed network architecture with various lower-ranking physical communication and data networks.

FIG. 1 is a schematic of a distributed network architecture which is manifest in 3 layers. In the lowest layer (NT) in this Figure, the various physical networks can be seen as they exist at that time. These are a matter of data networks (CN, Corporate Networks, Internet) and communication networks (MN, PSTN), though many others are conceivable. In particular, there are no connections or only insufficient connections between the individual networks. The middle layer (PT) shows the distributed network architecture that is established "over" the physical networks (NT) and that serves for service integration. The individual physical networks are each connected to a data network (2) via at least one connection (1) and one suitable interface in a network element (3). The representation of the data network as a ring is only one possibility. That is, the structure of the data network is not significant to the invention.

Essentially identical distributed network elements (3,5) are located in this data network (PT), the elements being adaptive in view of requirements placed on their performance. Individual network elements (5) can also be used exclusively to control the network by providing services and functions that are required for this purpose. Other network elements (3) perceive the communication and interworking with the lower-ranking physical networks (NT) and provide the interfaces that are necessary for this.

The interworking and exchange of information (such as for registering network elements, services and functions) is controlled by the distributed network operating system (6). This resides in the individual network elements (3,5).

In the uppermost "layer" (RT), the networks or network elements of the service providers and integrators which handle the customers are located. These are likewise connected to the data network via suitable interfaces (4). Via these, the information that is required on this end (for authenticating users, administration of services, charging of service usage, etc.) is exchanged. This can be accomplished via system-independent interfaces, which guarantees an appreciable simplification of the communication even of different service providers and service integrators with one another.

Figure 2:
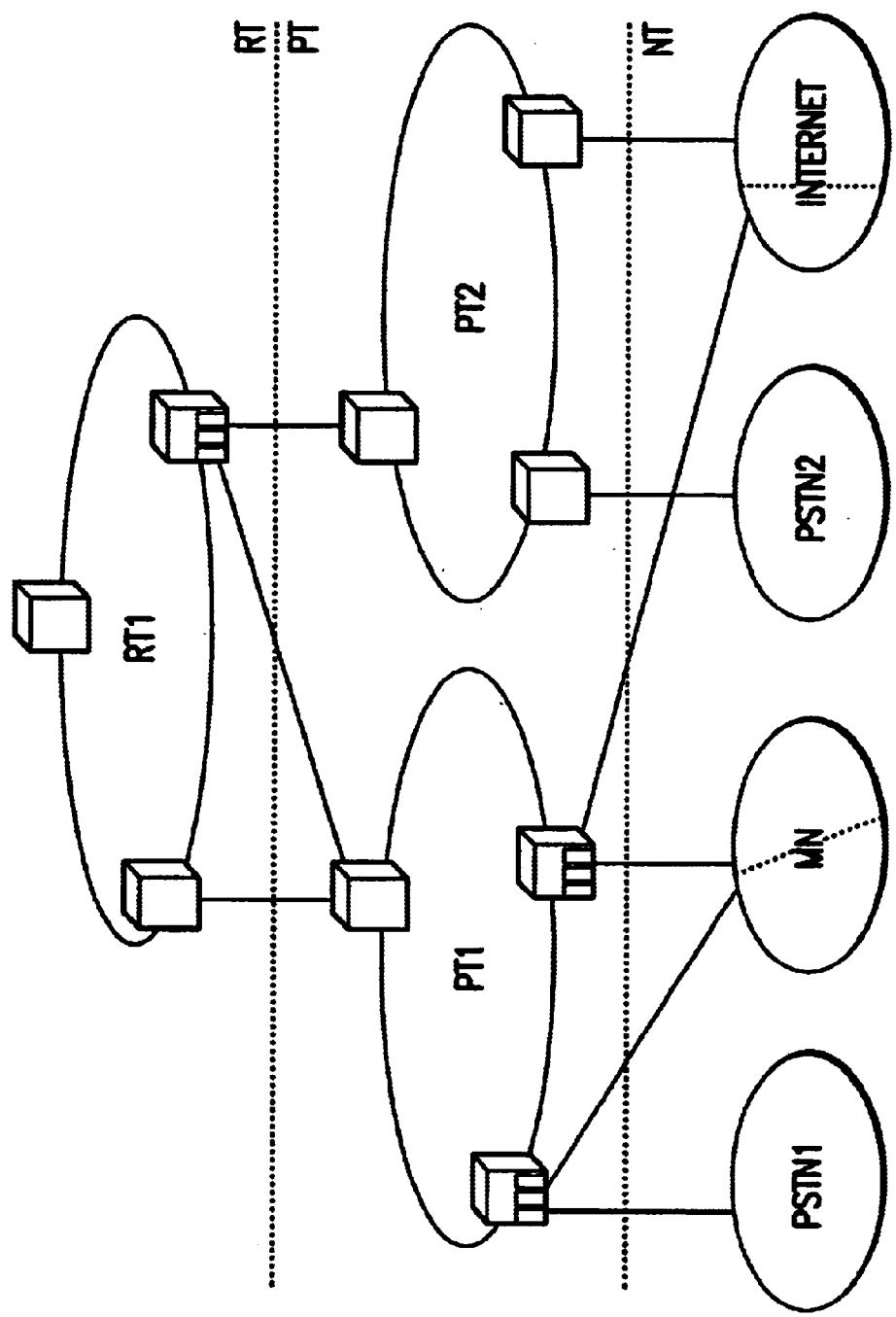
FIG. 2 illustrates another distributed network architecture, which as been divided into 3 logic layers.

FIG. 2 shows another possible design of a distributed network architecture. In particular, several parallel networks (PT1,PT2) and (PSTN1, MN, PSTN2, Internet) are possible on one level. The corresponding system-specific interfaces are also present in the network elements, given access to different network elements from lower-ranking layers.

Several base networks (NT) of the same type can be accessed in parallel (PSTN1 and PSTN2), such as stationary networks of different countries or operators.

When several "higher-ranking" network elements of different service providers (PT1,PT2) access a base network (Internet), the base network resources are distributed dynamically (dotted line).

Figure 3:
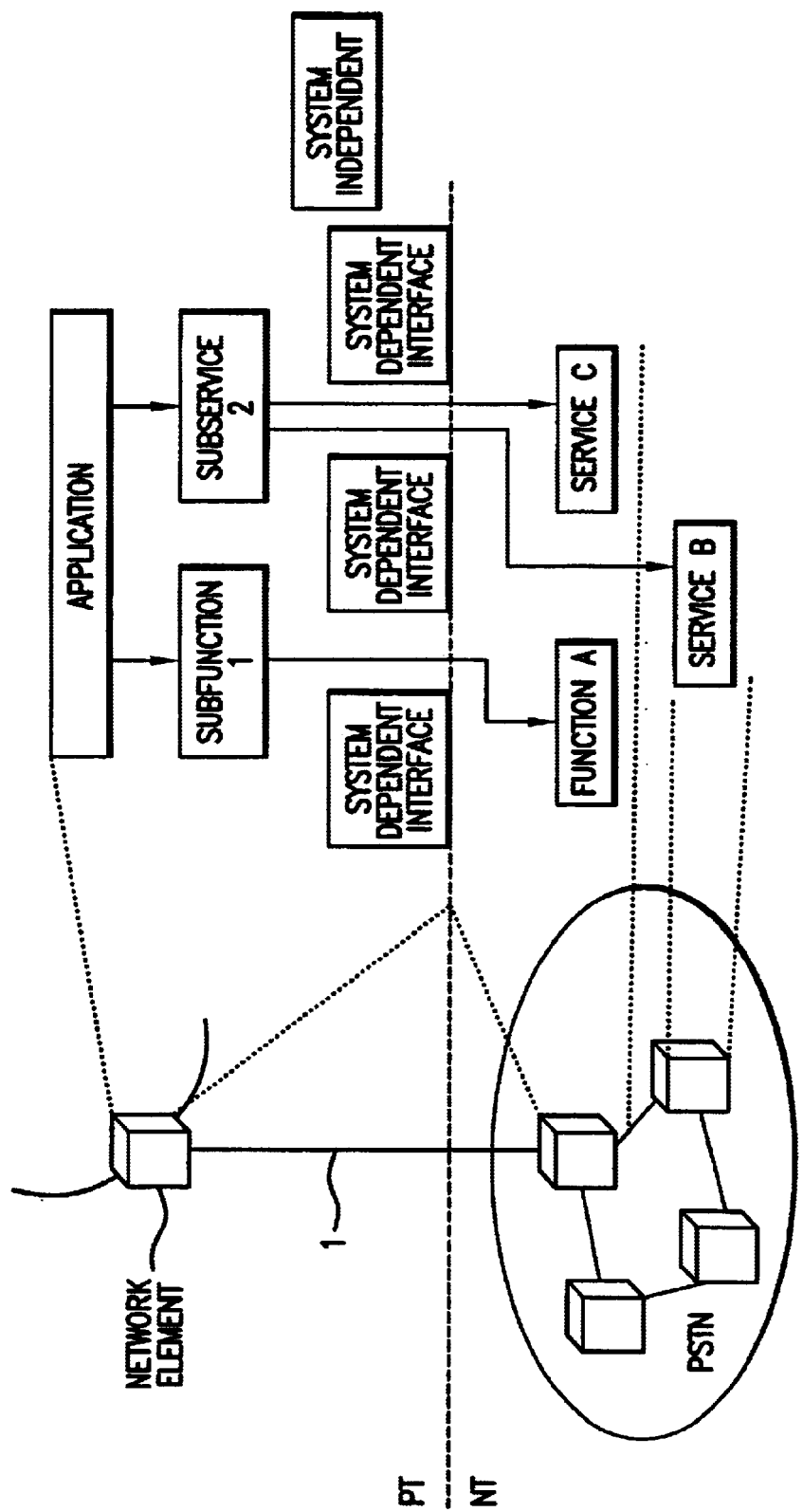
FIG. 3 illustrates a network element which communicates with a physical base network by means of a server-specific transport mechanism.

FIG. 3 describes a call of an application which is accomplished by the user of a value-added service. This application call is then first divided in the network element into several subfunctions and subservices (subfunction 1, subservice 2). Next, the network element ascertains that it is connected directly to the lower-ranking base network which provides the necessary functions and services (function a, service b,c). Using a server-specific transport mechanism, the network element 1 transfers the function calls to the lower-ranking base network (PSTN) via the system-dependent interface (1). The directly connected network element can then execute several of these calls (function a, service c) and forwards the other calls (service b) to a neighboring network element that provides the needed functionality (see FIG. 4).

Figure 4:
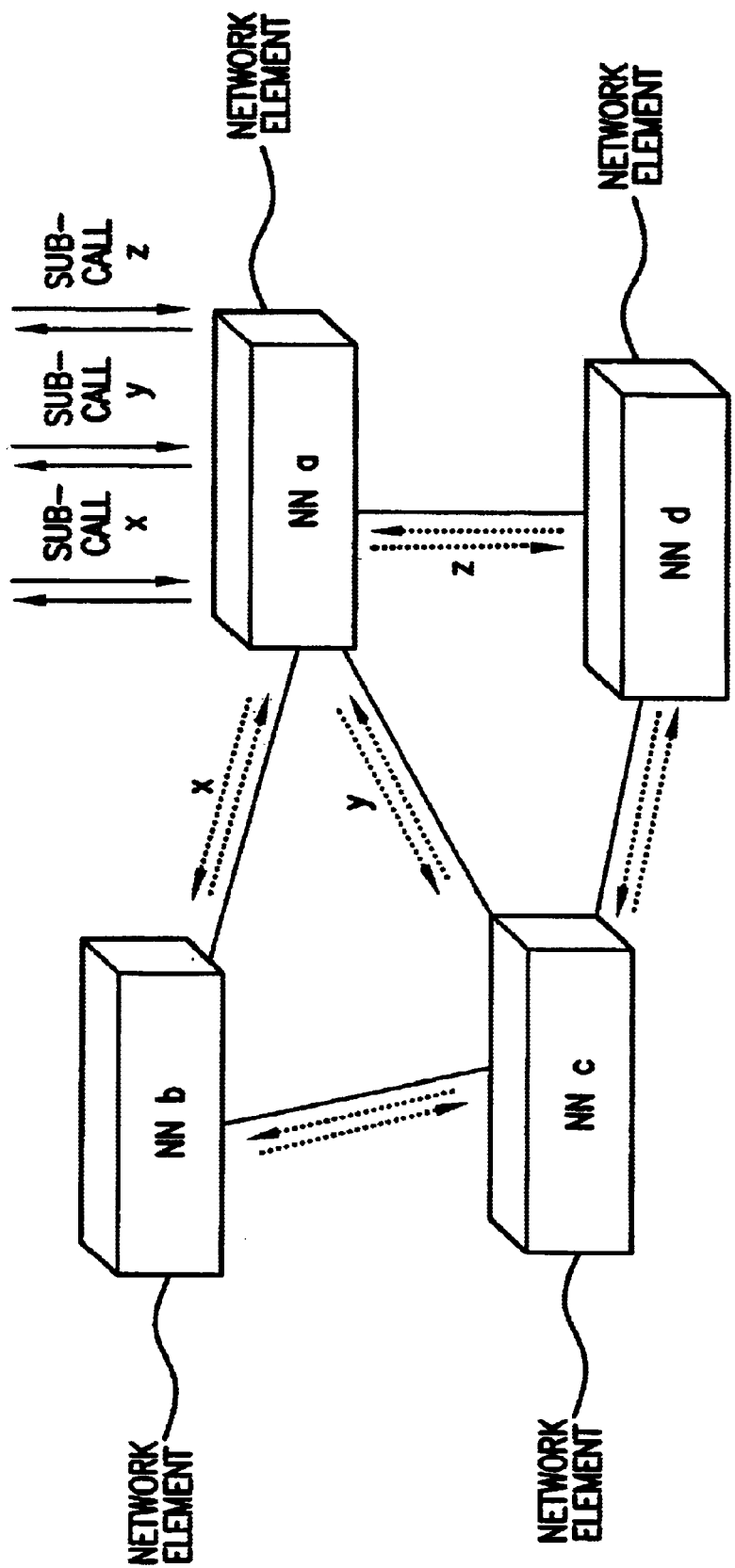
FIG. 4 illustrates an application call coming from an API manager of a client, which is divided and routed to the executing network nodes (server)

FIG. 4 shows a section of the new architecture that is ranked above the physical networks.

There are 4 network elements (NN1–NN4, Network Node, Network Element) illustrated, that are connected via a data network and exchange function and service calls and information under the control of a distributed network operating system.

An API manager residing in one of the network elements (client) routes calls, which pertain to applications, of network functions and services to the executing network elements (NN b,c,d). The API manager provides the required routing information network-wide for this purpose. This information is exchanged between the network elements and kept consistent.

This way, resources that are distributed network-wide can be used. This makes it possible to share the load by addressing identical functions in several network elements.

The example illustrated in the FIG. 4 contains a call containing several sub-calls (x,y,z). The first addressed network element cannot process the sub-call, however, since it does not provide the requested functions or since its capacity is already fully loaded.

In this example, the first addressed network element routes the function and service calls to a neighboring network element, and so an application (xyz) can be further processed at three different network elements in parallel. One network element (NNb) takes over the processing of functional part x; network element (NNc), the processing of y; and network element (NNd), the processing of z.

The routing of the individual subservices and subfunctions to the processing network elements can be controlled by various criteria. The presence of the required functions and services and the occupancy of the individual network elements are cited as examples here. An additional criterion can represent the length of the path to the processing node. Further criteria are also conceivable.

Figure 5:
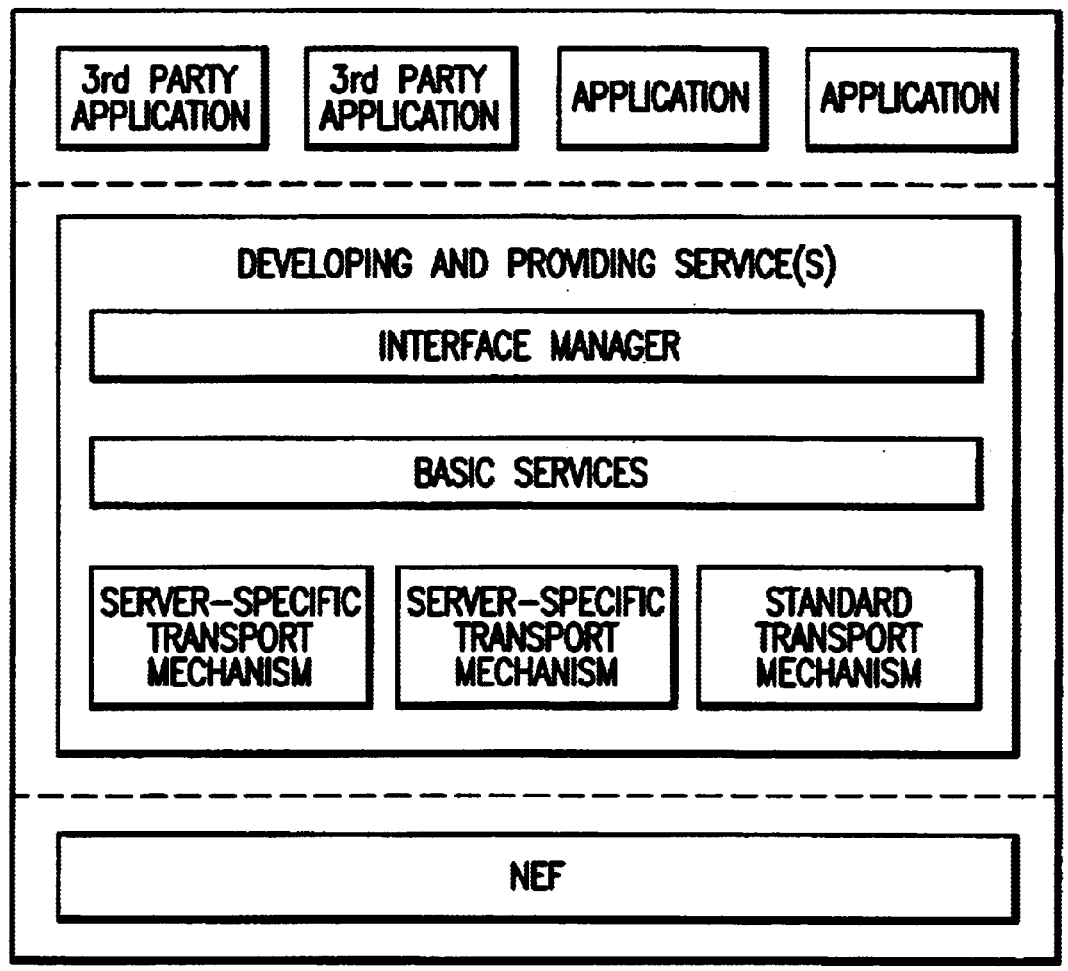
FIG. 5 a the structure of a network element from the client's perspective.

FIG. 5 shows the functional structure of a network element a client.

The top application layer is only implemented in the client. Application calls ($3^{rd}$ party application) are divided here into function and service calls and further processed.

The service development layer consists of an interface manager (interface manager), for example an API (Application Programming Interface) manager, which takes on the following tasks:

providing a set of system-independent open interfaces;
receiving calls via these interfaces and converting them into corresponding function and service calls;
selecting paths of the function and service calls; and
updating path selection information so that new network elements and new functions and services are taken into account optimally quickly; and
producing an internal connection to the transport mechanisms.

Commonly required services and functions are likewise processed (basic services). These may include address conversion, data management, monitoring processes.

In a server-specific transport mechanism, the function or service call is transferred for processing directly to a responsible network element in a base network. The call format used for this is dependent on the underlying base network (e.g., MAP).)

Otherwise (standard transport mechanism), the call is routed to a neighboring network element, which divides the call if necessary, transfers the call to a base network for execution, or forwards the call to a neighboring network element.

The network element function layer (NEF) is the physical interface for the transport of calls and information to neighboring network elements.

Figure 6:
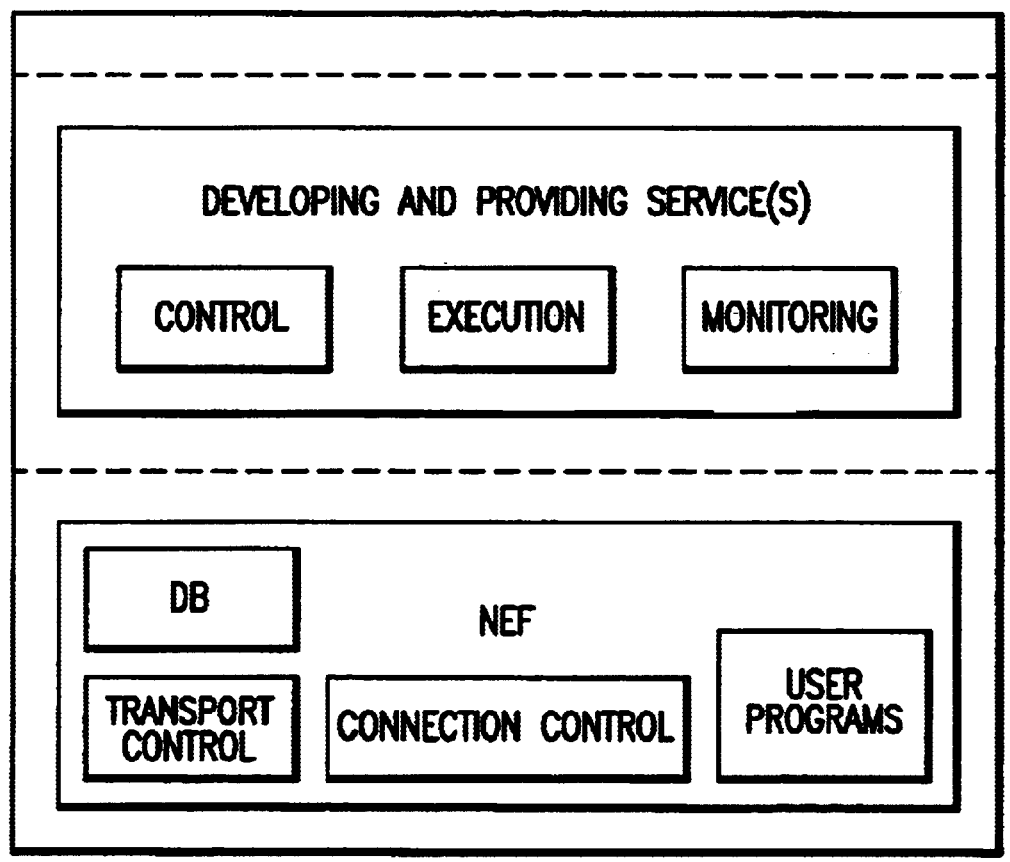
FIG. 6 illustrates the structure of a network element from the server's perspective.

FIG. 6 illustrates the functional structure of a network element as a server.

The application layer is not implemented here.

The service development has the following tasks for the functioning of the network element:

firewall;

access check;

filter;

monitoring and controlling calls.

The third layer (NEF, Network Element Function layer) is responsible for executing the function and service calls, particularly:

connection control;

data maintenance;

performance feature control;

transport control.

Figure 7:
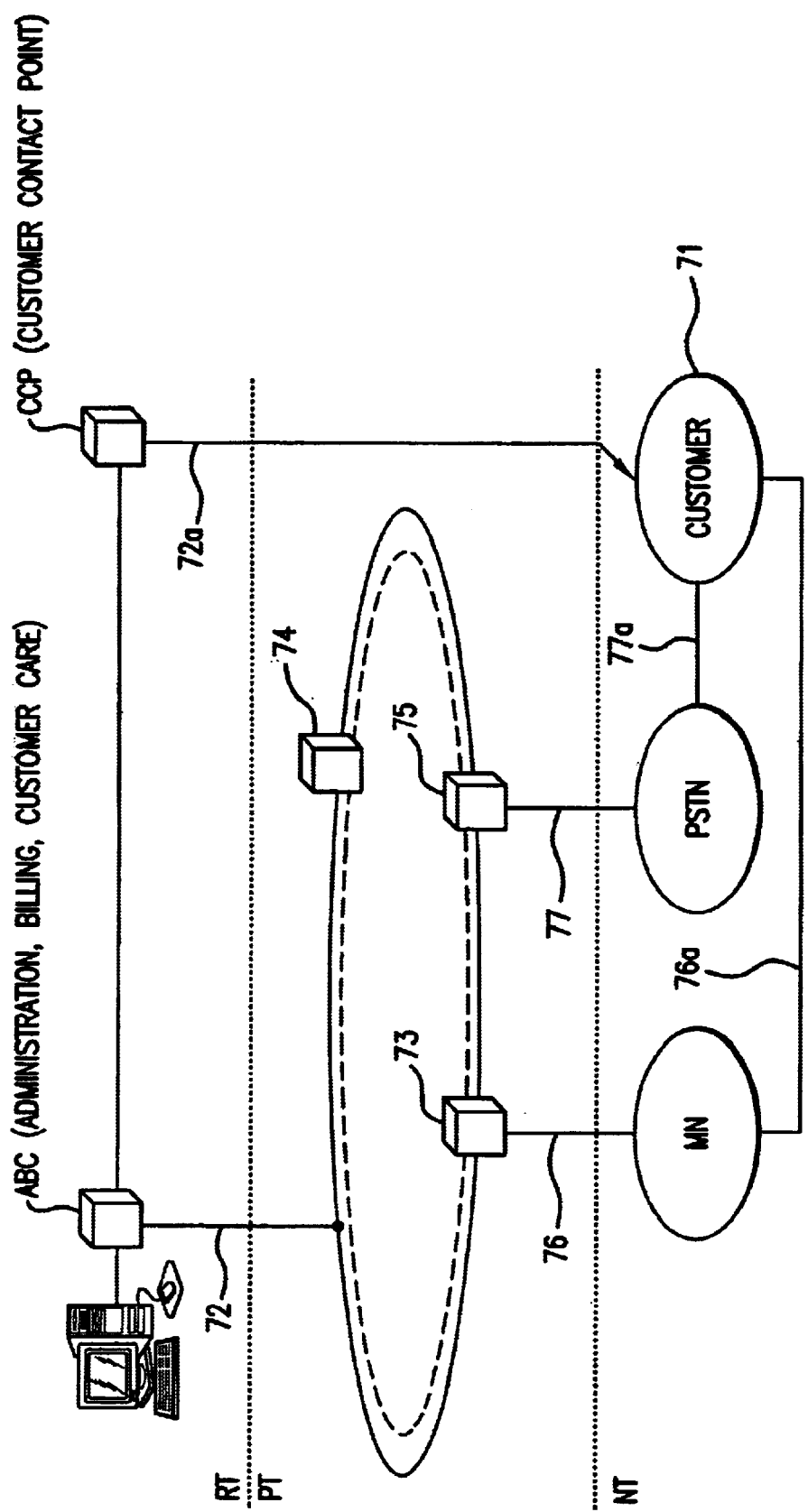
FIG. 7 illustrates an example of a distributed network architecture having 2 lower-ranking physical networks and a service provider.

To further detail the network architecture described in FIG. 1, a more precisely defined configuration is laid out in FIG. 7.

A user (71) subscribes to a value-added service consisting of a stationary network service and a mobile radiotelephone service. The services are provided by two different networks operators (PSTN,77a) and (MN,76a). The service provider stores and manages the customer profile in its customer service center (ABC, Administration, Billing, Customer-Care Center) and assesses charges for the purchased value-added services (72a).

The relevant information if such as customer identification, stationary network call number and mobile radiotelephone call number, services profile for the subscription to the respective service is forwarded by the service provider from the service provider to the service integrator via an interface (72) (e.g., realized by an API, Application Programming Interface). With the aid of the service parameters requested by the service provider, the corresponding network elements (73, 75) that are connected to the physical networks of the network operator and that operate the appropriate interfaces (76, 77) are actuated to accomplish this by the service integrator via a network element (74). These interfaces are oriented to the system-specific requirements of the respective physical network.

If the user (71) has not yet been released at the network operators, this is done by the network operator by executing the request of the service integrator. The necessary basic services and performance features are set. The successful establishment of the user as service subscriber is communicated by the network operator to the service integrator and back to the service provider again from there (in accordance with the transaction principle). A suitable network element (73 or 75) of the service integrator receives this acknowledgment, evaluates it, and, with the aid of the value-added services requested by the service provider, obtains additional needed services and functions and thus network elements (73 or 75). Next, it forwards the required information to the participating network elements (73,75) via the connecting network (2). These, in turn, forward the remaining requests to the corresponding network elements of the network operators which are located in MN or PSTN subsequent to processing the information that has come in.

When all services of the network operator that are needed for a value-added service of the service provider have been released and confirmed via the interface (76), (77), the service integrator confirms the complete release of the value-added service for a customer ID via the interface (72) to the service provider, which notifies the customer of this release, for instance via the customer contact point (CCP) via the interface (72a). The value-added service can then be used by the customer.

Usage-dependent information which is obtained on the basis of the usage of the basic services in the network elements of the network operator is forwarded first to the service integrators via the interface (76,77). In the network elements (73), (75), (74), this information is collected corresponding to the integrated value-added services available to the service provider, is provided with an identification (user ID, service ID), and is forwarded to the customer service center (ABC) via an interface (72). Now the service provider is in the position to allocate the received information to the respective customer profile, to evaluate it, and to assess charges (8).

While this invention has been described in connection with what are presently considered to be the most practical and preferred embodiments, it is to be understood that the invention is not limited to the disclosed embodiments, but, on the contrary, is intended to cover various modifications and equivalent arrangements included within the spirit and scope of the appended claims.

Reference Characters

ABC Administration, Billing, Customer-Care Center
AMA Automatic Message Accounting
API Application Programming Interface
CN Corporate Networks
INAP Intelligent Network Application Part
ISDN Integrated Services Digital Network
ITU International Telecommunication Union
MAP Mobile Application Part
NEF Network Element Functional Layer
POTS Plain Old Telephone Service
SCP Service Control Point
SS7 Signaling System No. 7
Source Literature
Distributed Operating Systems
Tanenbaum, A. S.
Prentice Hall International 1995
Q.1200
ITU-T General Recommendations On Telephone Switching And Signalling—Intelligent Network (March 1993)

What is claimed is:

1. A method for controlling a layered network architecture having network elements in a network of at least one of physical data networks and communication networks, the method comprising the steps of:

connecting one or more higher-ranking network elements in the network that provide network functions and services; and providing a distributed network having system-independent interfaces, the distributed network integrating the network functions and services and basic services from lower-ranking physical data networks via the one or more higher-ranking network elements and making the network functions and services and basic services available to an uppermost layer via the system-independent interfaces.

2. The method as claimed in claim 1, wherein at least one of the physical data networks and communication network are dynamically expanded by inserting at least one of additional higher-ranking network elements and additional physical data networks.

3. The method as claimed in claim 1, wherein operating system components contained in one different higher-ranking network elements work with one another according to a client-server principle, where the operating system components enable a higher-ranking network element to function as both client and server dependent on whether the higher-ranking network element is requesting or executing network functions and services.

4. The method as claimed in claim 1, further comprising the step of:

dividing applications into network function calls and network service calls, which are processed by at least one higher-ranking network element, the function calls and network service calls being different with respect to the basic function of the at least one higher-ranking network element.

5. The method as claimed in claim 1, further comprising the steps of:

routing network function calls and network service calls to their corresponding higher-ranking network elements in the network;

translating the network function calls and network service calls within the corresponding higher-ranking network elements into calls of network functions and services that correspond to respective physical data networks; and transmitting the translated calls of network function and services to higher-ranking network elements that have required basic services and functions for those calls and processing the calls by the corresponding higher-ranking network elements.

6. The method as claimed in claim 1, wherein an operating system is provided that is subdivided into three functional layers respectively comprised of an application layer, a service development layer and a network element function layer.

7. The method as claimed in claim 6, wherein the service development layer fulfils at least one of conversion of applications into network function and network service calls via corresponding interfaces, forwarding network function and service calls according to a prescribed manner, managing resources, billing services, processing collected billing data for rating, safety management, processing error messages, monitoring transactions, and managing information.

8. The method as claimed in claim 6, wherein the service development layer provides functions for at least one of the following tasks in a higher-ranking network element that functions as a server:

control of received function and service calls, execution of received function and service calls and monitoring of received function and service calls.

9. The method as claimed in claim 6, wherein the service development layer performs at least one of the following tasks in a higher-ranking network element that functions as a client:

operating an interface, providing frequently needed basic services, providing at least one server-specific transport mechanism and providing a standard transport mechanism.

10. The method as claimed in claim 9, wherein the operation of the interface includes the following functions:

providing system-independent interfaces of the service development layer to the application layer, receiving application calls and converting them into system-specific function and service calls, distributing the system-specific function and service calls according to information that is stored in the higher-ranking network elements about distribution of the functions to processing higher-ranking network elements, dynamically updating the information about distribution of the functions and services to the individual network elements and corresponding path selection information and producing internal connections to system-specific transport mechanisms.

11. The method as claimed in claim 9, wherein a server-specific transport mechanism converts function and service calls that are transferred to the server-specific transport mechanism into a system-specific format corresponding to allocated lower-ranking network elements and forwards the function and service calls or corresponding higher-ranking network elements.

12. The method as claimed in claim 9, wherein a standard transport mechanism converts the function and service calls that are transferred to the standard transport mechanism into a specific format corresponding to neighboring higher-ranking network elements and forwards said function and service calls to the neighboring higher-ranking network elements.

13. The method as claimed in claim 9, further comprising the steps of:

guaranteeing dynamically updating of the information contained in the higher-ranking network elements about services or functions that are available in the network by an updating mechanism in which, subsequent to an introduction of a new function or a new service, corresponding higher-ranking network elements update the information of the transport mechanism that respectively pertains to the corresponding higher-ranking elements;

distributing the information to neighboring higher-ranking network elements and lower-ranking network elements that use the transport mechanisms; and updating additional information in the network elements.

14. The method as claimed in claim 1, further comprising:

providing a functional layer in each the higher-ranking network elements that guarantees that transfer and execution of received function and service calls by appropriate basic functions and basic services is performed.

15. The method as claimed in claim 1, further comprising the step of:

dividing the network into functional network domains comprised of core network elements and standard network elements.

16. The method as claimed in claim 15, wherein the core network elements execute application requests and function and service calls and ensure that execution of the application requests and function and service calls is accomplished using at least one of a requested and required quality of service.

17. The method as claimed in claim 16, wherein the standard network elements perform at least one of detection of function and service calls, classification of function and service class, process function at service calls to the extent that such processing cannot be performed by core network elements and forwarding function and service calls.

* * * * *